(12) United States Patent  
Komara et al.

(10) Patent No.: US 6,690,662 B1  
(45) Date of Patent: Feb. 10, 2004

(54) METHOD AND APPARATUS EMPLOYING WIRELESS IN-BAND SIGNALING FOR DOWNLINK TRANSMISSION OF COMMANDS AND UPLINK TRANSMISSION OF STATUS FOR A WIRELESS SYSTEM REPEATER

(75) Inventors: Michael A. Komara, Indialantic, FL (US); Thomas R. Schmutz, Indialantic, FL (US); Roger L. Overton, Huntington Station, NY (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

(21) Appl. No.: 09/397,921

(22) Filed: Sep. 17, 1999

Related U.S. Application Data

(60) Provisional application No. 60/101,147, filed on Sep. 18, 1998.

(51) Int. Cl.[7] .................. H04B 7/216; H04B 14/04; H03K 11/00; H04L 25/60; H04L 25/64
(52) U.S. Cl. .................. 370/342; 375/214; 375/350; 455/11.1; 455/424; 455/561
(58) Field of Search ............. 370/345, 215, 370/324, 321; 340/905, 342; 455/446, 561, 11.1, 7, 424; 375/350, 214

(56) References Cited

U.S. PATENT DOCUMENTS

| | | | |
|---|---|---|---|
| 4,320,523 A | * | 3/1982 | Horikawa et al. .......... 375/350 |
| 5,095,528 A | | 3/1992 | Leslie et al. |
| 5,422,929 A | | 6/1995 | Hurst et al. |
| 5,425,076 A | | 6/1995 | Knippelmier |
| 5,537,435 A | | 7/1996 | Carney et al. |
| 5,649,292 A | | 7/1997 | Doner |
| 5,726,980 A | | 3/1998 | Rickard |
| 5,784,406 A | | 7/1998 | DeJaco et al. |
| 5,953,637 A | | 9/1999 | Coons et al. |
| 5,970,406 A | | 10/1999 | Komara |
| 5,974,325 A | | 10/1999 | Kotzin et al. |
| 6,104,934 A | * | 8/2000 | Patton et al. ............... 455/561 |
| 6,339,694 B1 | * | 1/2002 | Komara et al. ............. 455/11.1 |
| 6,370,185 B1 | * | 4/2002 | Schmutz et al. ........... 375/214 |
| 2001/0031621 A1 | * | 10/2001 | Schmutz ..................... 455/7 |
| 2002/0028675 A1 | * | 3/2002 | Schmutz et al. ........... 455/424 |

* cited by examiner

Primary Examiner—William Cumming
(74) Attorney, Agent, or Firm—Akerman Senterfitt

(57) ABSTRACT

An approach to improving TDMA system operation is disclosed wherein in-band translator components are located in the center of remote cells which would normally contain a base transceiver system (BTS). The in-band. translators employ wireless in-band signaling for downlink transmission of commands from an operation and maintenance center (OMC) and uplink transmission of status-indicating and alarm signal data. The remotely located repeaters of the present invention have frequency shift key detection and demodulation capability incorporated in the downlink path, while also incorporating FSK modulation capability into the uplink path. This allows the repeater to extract commands from the serving BTS downlink signal and act on them. It also allows for the repeater to transmit status-indicating signals and alarms to the OMC via the uplink path to the serving BTS.

7 Claims, 5 Drawing Sheets

METHOD AND APPARATUS EMPLOYING WIRELESS IN-BAND SIGNALING FOR DOWNLINK TRANSMISSION OF COMMANDS AND UPLINK TRANSMISSION OF STATUS FOR A WIRELESS SYSTEM REPEATER

This application is related to and claims priority from U.S. Provisional Application No. 60/101,147 entitled "METHOD AND APPARATUS EMPLOYING WIRELESS IN-BAND SIGNALING FOR DOWNLINK TRANSMISSION OF COMMANDS AND UPLINK TRANSMISSION OF STATUS FOR A WIRELESS SYSTEM REPEATER" filed Sep. 18, 1998, the entirety of which is incorporated herein by reference.

FIELD OF THE INVENTION

This invention relates generally to wireless communication systems. More specifically, this invention relates to remote repeaters in wireless communication systems and in particular to a method and apparatus for employing in-band signaling for downlink transmission of commands and uplink transmission of status in a wireless system repeater.

BACKGROUND OF THE INVENTION

As demand increases dramatically for wireless communication services such as Global System for Mobile Communications (GSM), Cellular Mobile Telephone (CMT), and Personal Communication Services (PCS), the operators of such systems are required to serve an increasing number of users. As a result, a type of base station equipment known as a multicarrier broadband Base Transceiver System (BTS) has been developed which is intended to serve a large number of active mobile stations in each cell. Such broadband BTS equipment can typically service ninety-six simultaneously active mobile stations, at a significant cost per channel.

A conventional cellular phone system 100 is shown in FIG. 1. As illustrated in FIG. 1, the cellular phone system 100 includes a plurality of cells 110a, 110b, a mobile unit 120, a plurality of broadband base transceiver stations (BTS) 105a, 105b, dedicated telephone lines 140, a base station controller (BSC) 130, an A interface 150, a Network and Switching Subsystem (NSS) 160 and a landline switched telephone network 170. An Operations and Maintenance Center (OMC) 180 is connected to BSC 130 through a Network Management Interface 190.

The cellular phone system 100 has a fixed number of channel sets distributed among the BTS 105a, 105b serving a plurality of cells 110a, 110b arranged in a predetermined reusable pattern. Maximum utilization efficiency of the BTS 105 in densely populated urban environments can be obtained through an efficient frequency reuse scheme, such as that described in U.S. Pat. No. 5,649,292 entitled "A Method For Obtaining Times One Frequency Reuse in Communication Systems" issued to John R. Doner and assigned to AirNet Communications Corporation, who is the assignee of the present application. According to that arrangement, each cell is split into six radial sectors and frequencies are assigned to the sectors in such a manner as to provide the ability to reuse each available frequency in every third cell. Although this frequency reuse scheme is highly efficient, it requires at least two complete multicarrier, broadband base transceiver systems (BTS) to be located in each cell. Such a configuration results in dramatically increased hardware installation costs for each cell.

Returning to FIG. 1, the mobile unit 120, in a cell 110a or 110b, communicates with the BTS 105a or 105b via radio frequency (RF) means, specifically employing one of the fixed number of channels. The BTS 105a, 105b communicate with the BSC 130 via dedicated telephone lines 140. The BSC 130 communicates with the NSS 160 via the A interface 150.

In the cellular phone system 100, the cell areas typically range from 1 to 300 square miles. The larger cells typically cover rural areas, and the smaller cells typically cover urban areas. Cell antenna sites utilizing the same channel sets are spaced by a sufficient distance to assure that co-channel interference is held to an acceptably low level.

The mobile unit 120 in a cell 110a has radio telephone transceiver equipment which communicates with similar equipment in BTS 105a, 105b as the mobile unit 120 moves within a cell or from cell to cell.

Each BTS 105a, 105b relays telephone signals between mobile units 120 and a mobile telecommunications switching office (MTSO) 130 by way of the communication lines 140.

The communication lines 140 between a cell site, 110a or 110b, and the MTSO 130, are typically T1 lines. The T1 lines carry separate voice grade circuits for each radio channel employed at the cell site and data circuits for switching and other control functions.

While the cellular communications system arrangement of FIG. 1 is cost effective to deploy when a large number of active mobile stations is expected in each cell, it is not particularly cost effective in most other situations. For example, during an initial system build out phase, a service provider ordinarily does not need to use a large number of radio channels. It is therefore typically not possible to justify the cost of deploying complex multicarrier broadband transceiver, system equipment based only upon the initial number of subscribers. As a result, the investment in conventional broadband multicarrier radio equipment may not be justified until such time as the number of subscribers increases to a point where the channels are busy most of the time. Furthermore, many areas exist where the need for wireless communication systems is considerable, but where signal traffic can be expected to remain low indefinitely (such as in rural freeway locations or large commercial/industrial parks). Because only a few cells at locations of high traffic demand (such as in a downtown urban location or a freeway intersection) will justify the initial expense of building out a network of high capacity broadband transceiver systems, the service provider is faced with a dilemma. He can build-out the system with less expensive narrowband equipment initially, to provide some level of coverage, and then upgrade to the more efficient equipment as the number of subscribers rapidly increases in the service area. However, the initial investment in narrowband equipment is then lost. Alternatively, a larger up front investment can be made to deploy the high capacity equipment at the beginning, so that once demand increases, the users of the system can be accommodated without receiving busy signals and the resultant blocked calls. But this has the disadvantage of requiring a larger up-front investment.

These concerns have led to the increased popularity of wireless repeaters, which can increase the capacity of cells without requiring the expense or complication of a multicarrier broadband BTS for each cell. FIG. 2 is a block diagram of the components of a wireless communication system that makes use of wireless repeaters.

FIG. 2 illustrates a wireless communication system 200 such as a Cellular Mobile Telephone, Personal Communication System (PCS), or similar system in which employing slot-by slot diversity selection in the uplink signal paths of a wireless system repeater translator enables proper demodulation at the BTS of signals received from remote repeater base stations deployed in peripheral cells.

The system 200 provides voice and or data communication between mobile stations 210 and a Public Switched Telephone Network (PSTN) (not shown) via radio signals. In the particular embodiment of the invention being described, the radio signaling protocol, or "air interface," uses a Time Division Multiple Access (TDMA) technique such as the GSM-1900 (formerly PCS-1900) standard promulgated by the Telecommunications Industry Association (TIA) in the United States which adopts all relevant aspects of the Global System for Mobile Communication (GSM) standard developed by the Groupe Special Mobile, and promulgated in Europe and elsewhere by the European Telecommunication Standards Institute (ETSI).

The remotely located repeaters 220-1, 220-2, . . . , 120-n (also referred to herein as the "remote base stations") are each located in what is normally to be approximately the center of a group or cluster 240 of cells comprising individual cell sites 250-1, 250-2, . . . , 250-n. The remotely located repeaters 220 receive radio signals from the mobile stations 210 located in their respective,cells 250 and forward these signals to the associated multichannel host broadband Base Transceiver System (BTS) 260. Likewise, radio signals originating at the host BTS 260 are forwarded by the repeaters 220 to the mobile stations 210. As a result, the signals associated with all of the mobile stations 210 located within the cluster 240 of cells 250-1, . . . , 250-n are thereby processed at the host BTS 150.

The remotely located repeaters 220 can be used to extend the coverage of a single cell, or they can be configured as "base stations" in the sense that they are each associated with a particular cell 250 and in that they each receive and transmit multiple signals from and to the mobile stations 210. However, the remotely located repeaters 220 do not perform demodulation and modulation functions as does a conventional base station. Rather, in their most basic form, they serve only to amplify signals received from the mobile stations 210 and then direct such signals to the multichannel host BTS 260. More complex versions of remote repeaters perform frequency translation as well as amplification of the signals received from the mobile stations 210, and subsequently direct those amplified and translated signals on a different frequency to the multichannel host BTS 260. When the frequencies employed by the remote repeaters 220 are all within the frequency band allocated to the cell cluster 240, the repeaters 220 are considered "in-band" frequency-translating repeaters. The remotely located repeaters 220 also perform the inverse function, receiving signals from the host BTS 260 and then directing them to the mobile stations 210, including frequency translation.

Also shown in FIG. 2, the multichannel host BTS 260 is connected to a Base Station Controller 270 through an A Interface 280, and the BSC 270 is connected to an Operations and Maintenance Center (OMC) 290 through a Network Management Interface 295. In any conventional wireless communications system, whether it employs remotely located repeaters or not, the OMC 290 receives alarms and status-indicating signals from and sends commands to the base stations, whether they are representative of a multichannel host BTS 260 or a remotely located repeater base station 220. The OMC 290 typically communicates with several base station controllers 270.

In the wireless communications systems of the prior art, in order to conduct such two-way communications between the remote repeaters 220 and the OMC 290, a dedicated telephone line is required. Even in the case where the OMC 290 is physically co-located with the Base Station Controller 270, such an installation requires that a modem be installed in the remote repeater 220, and that telephone line installation and subscription and maintenance charges be incurred. These charges can be substantial, considering that a single OMC 290 can communicate with several BSCs 270. Whereas remotely located wireless repeaters 220 use RF backhaul signals to communicate with a host BTS 260, landline repeaters are connected to a host BTS by a wireline connection. Landline repeaters have successfully employed a solution to the problem of, status-indicating signal and alarm monitoring. U.S. Pat. No. 5,422,929 ('929) to Hurst et al. describes a method and apparatus for remotely testing and monitoring a landline repeater. A central office will send an interrogating signal with an address subfield. When the interrogating signal is recognized by a controller in the landline repeater, the controller causes the landline repeater to enter a loopback mode where diagnostic and test-indicative no-operation signals are returned. For a given landline, any repeater attached to the landline could be addressed and tested. Although '929 describes the testing and monitoring for landline repeaters through the existing landline communication channel, '929 does not describe the testing and monitoring through a wireless communication channel and testing of the uplink and downlink paths of a wireless repeater.

U.S. Pat. No. 5,785,406 ('406) to DeJaco et al. describes a method and apparatus for testing through a wireless communication channel. In the '406 patent, a test signal is generated from a monitoring station located on a PSTN. The test signal is routed through the PSTN to a cellular communication system to a cellular phone. The test signal activates a loopback element within the cellular phone and the signal is re-routed back to the monitoring station. The monitoring station performs an analysis on the returned test signal.

Although the '406 patent describes the use of the loopback element in a mobile cellular phone through a wireless communication channel, '406 fails to disclose this loopback element for a wireless repeater. Furthermore, '406 fails to disclose how to implement this testing for a repeater and for testing the uplink and downlink paths of the wireless repeater.

It is thus readily seen that a need exists for a method of transmitting signals and for monitoring status-indicating signals and alarms between the OMC 290 and multiple remote repeater stations 220 without requiring the installation and use of modems and dedicated telephone lines.

OBJECTS OF THE INVENTION

It is an object of this invention to provide wireless signaling between an Operations and Maintenance Center and multiple remotely located repeater stations.

Another object is to provide for wireless downlink transmission of commands from an Operations and Maintenance Center to multiple remotely located repeater stations.

A further object is to provide for wireless uplink transmission of status and alarm signals to an Operations and Maintenance Center from multiple remotely located repeater stations.

It is yet another object of this invention to conduct such wireless signaling in-band, via the downlink and uplink RF paths.

SUMMARY OF THE INVENTION

Briefly, the invention is predicated on an architecture for a wireless communication system in which cells are grouped into clusters. A host cell location is identified within each cluster and a multicarrier broadband Base Transceiver System (BTS) is located at or near the host cell site.

Rather than deploy a complete suite of base station equipment at each remaining cell in the cluster, translating radio transceivers are located in the remote cells. In a preferred embodiment of the present invention, these translating radio transceivers operate in-band, that is, within the frequencies assigned to the service provider.

The repeaters operate in both an uplink and downlink direction. That is, uplink signals transmitted by a mobile station located in a remote cell are received at the repeater and then transmitted to the host BTS. Likewise, downlink signals transmitted by the host BTS are first received by the repeater and then transmitted to the mobile stations at high power.

The remotely located repeater has frequency shift key (FSK) detection and demodulation capability incorporated in the downlink path, while it also has FSK modulation capability incorporated in the uplink path. This allows for the repeater to, extract commands from the serving BTS downlink and act upon them. It also allows for the repeater to transmit status/alarms back to the serving BTS via the uplink. The BTS can then communicate these commands, status-indicating signals, and alarms with the Operations and Maintenance Center.

During normal operation, a modulated Gaussian Minimum Shift Key (GMSK) carrier from the BTS is continuously transmitted in the "backhaul" downlink to the remotely located repeater. This signal is received by the repeater via a directional antenna, and transmitted via an omni-directional antenna to the mobile handset. The signal transmitted from the repeater to the mobile unit is referred to as the remote "ground" downlink signal.

The handset returns its signal via the remote "ground" uplink path to the repeater, where it is typically received via two omnidirectional antennas. In the preferred embodiment, the repeater performs diversity selection and automatic level control (ALC) either through delay diversity combining or on a slot-by-slot switched diversity basis. This uplink signal is transmitted to the BTS via a directional antenna.

When an RF loopback test is desired, a "signaling waveform," such as a continuous wave (CW) tone, is transmitted over the "backhaul" downlink from the BTS to the remotely located repeater for a pre-determined amount of time. Phase/frequency discrimination circuitry is used to detect the change to a signaling waveform (e.g. CW carrier) from a modulated carrier, e.g. GMSK. The presence of the signaling waveform instructs the repeater to enter its RF loopback mode.

When in the RF loopback mode, a coupled sample of the high-power downlink transmit signal is attenuated, down-converted in frequency to the receive band, and coupled into both of the uplink low-noise input receive paths. The downlink backhaul carrier from the BTS is then modulated with "training bit" data to allow for accurate timing of the round-trip delay and path loss when the RF loopback signal is received over the uplink backhaul by the BTS. In the event of an alarm condition within any function of the repeater, the signal will not be looped back to the BTS and a system alarm will be directed to the Operations and Maintenance Center.

While the repeater is ,in the Loopback mode, the phase/frequehcy discrimination circuitry can also be used to detect phase/frequency-modulated downlink data (such as FSK) and the detected data bits can be interpreted by the repeater's microcontroller and acted upon. The downlink data can be used to re-configure various tuning frequency and target gain parameters.

Further, while the repeater is in the Loopback mode, the status-indicating and alarm data can also be sent back via the uplink path to the BTS. A simple phase/frequency modulation component can be switched or coupled into the uplink path and used to FSK-modulate data supplied by the repeater's microcontroller. This data can include internal status and alarm signals monitored by the repeater's microcontroller.

BRIEF DESCRIPTION OF THE DRAWINGS

For a more complete understanding of the invention and its novel advantages and features, reference should be made to the accompanying drawings in, which.

DETAILED DESCRIPTION OF A PREFERRED EMBODIMENT

Figure 1:
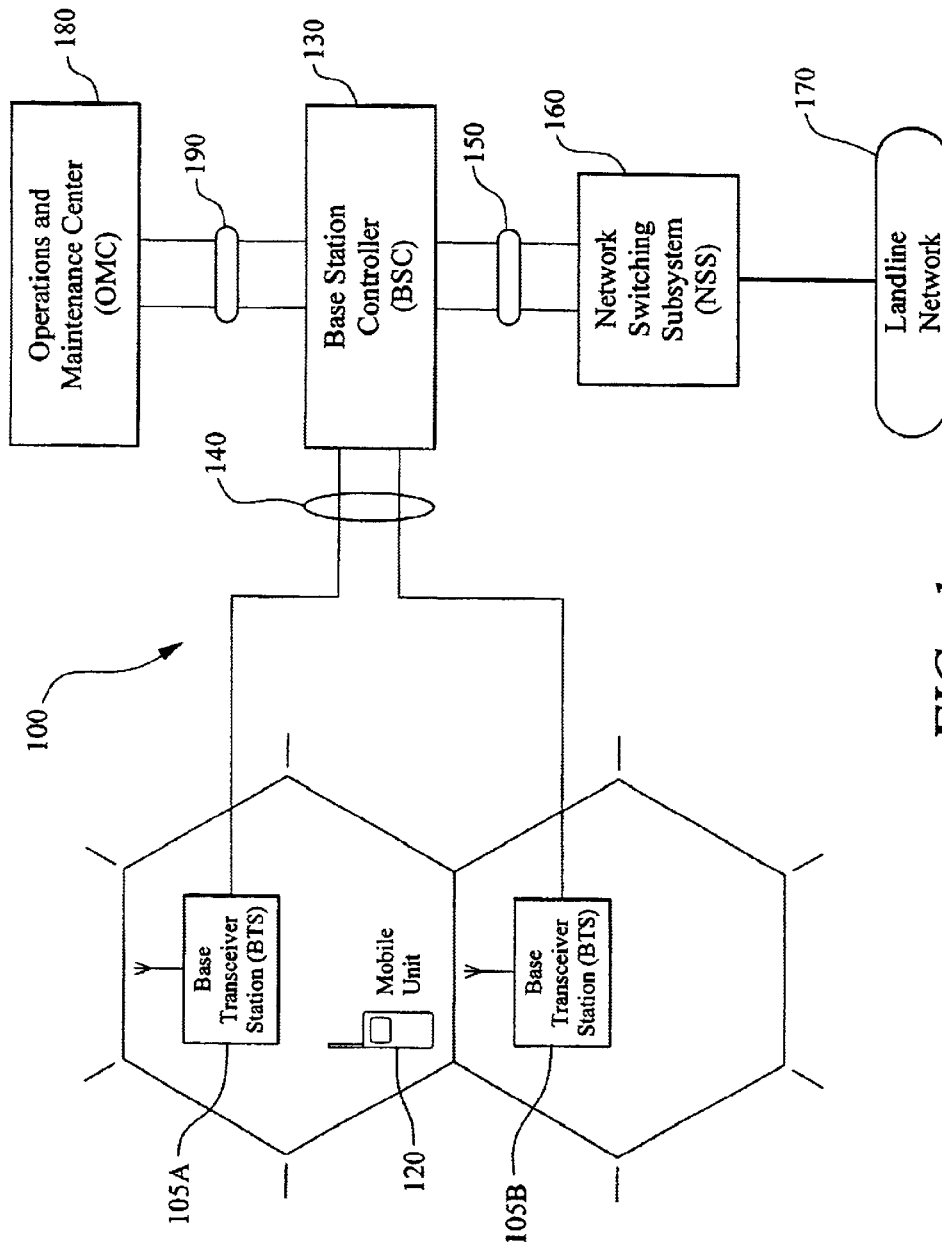
FIG. 1 is a block diagram of a conventional prior art wireless telecommunications system.
Figure 2:
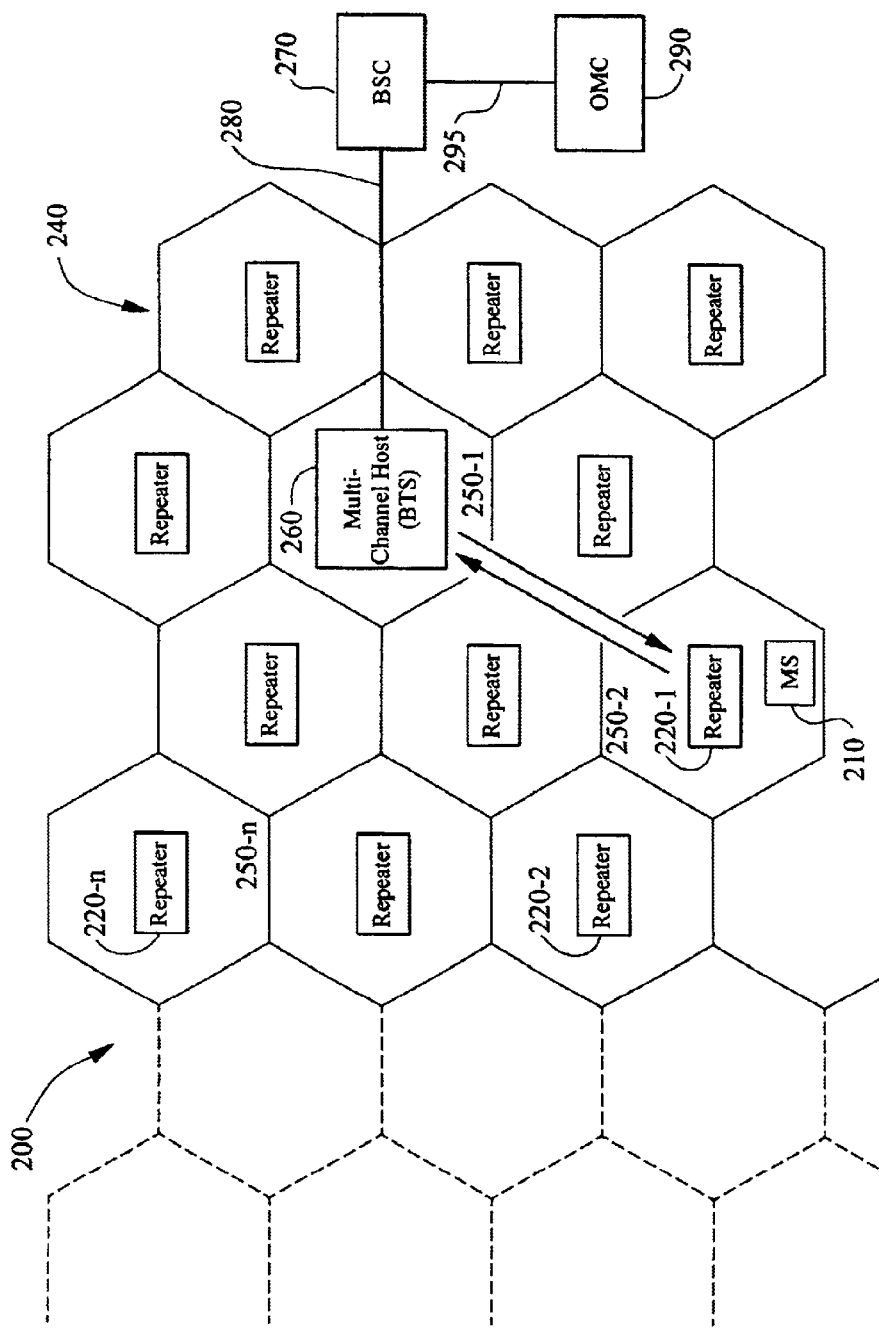
FIG. 2 is a view of a cell site cluster showing how a host Base Transceiver System (BTS), in-band translators, and mobile stations are deployed in a prior art wireless: telecommunications system.
Figure 3:
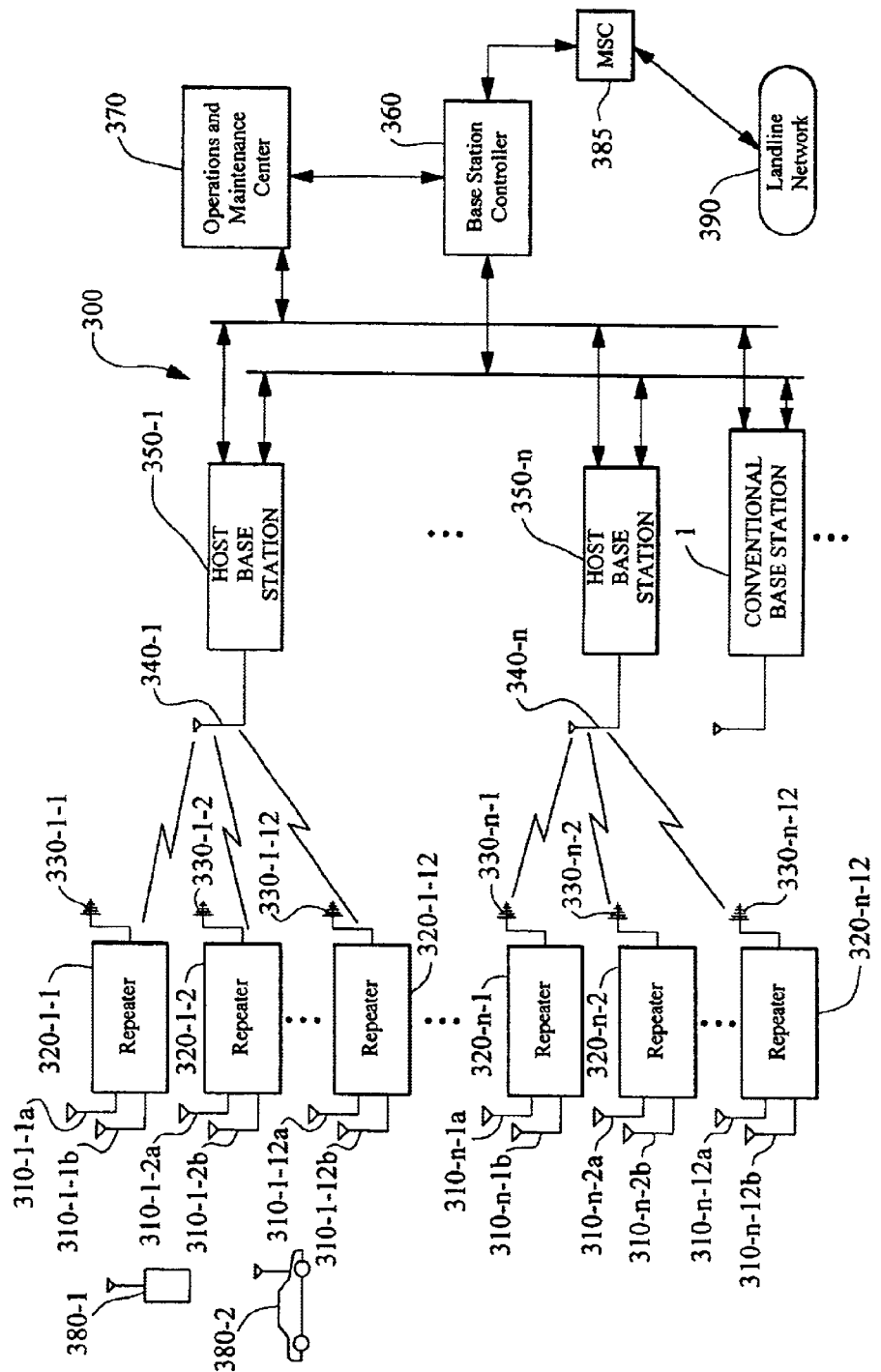
FIG. 3 is a block diagram of a wireless telecommunications system employing a preferred embodiment of the repeater of the present invention.

Turning attention now to FIG. 2, the system 300 more particularly includes pairs of translator omni-directional antennas 310-1-1a and 310-1-1b, . . . , 310-1-12a and 310-1-12b, . . . , 310-n-1a and 310-n-1b, . . . , 310-n-12a and 310-n-12b (collectively, the omni-directional antennas 310). The antenna pairs are connected to remotely located repeaters configured in the preferred embodimernt as in-band translator base stations (wireless translating range extenders) 320-1-1, . . . , 320-1-12, . . . , 320-n-1, . . . , 320-n-12, translator base station directional antennas (backhaul antennas) 330-1-1, . . . , 330-1-12, . . . , 330-n-1, . . . , 330-n-12, host base station omni-directional antennas 340-1, . . . , 340-n, and multichannel host Base Transceiver Systems (BTS) 350-1, . . . , 350-n. In the preferred embodiment of FIG. 3, the system 300 may also include one or more conventional base stations 355, in addition to the multichannel host Base Transceiver Systems (BTS) 350-1, . . . , 350-n. The system 300 also includes one or more base station controllers 360, an Operations and Maintenance Center 370, and mobile stations 380-1, 380-2. The system 300 also includes a Mobile Switching Center 385 connected to a Landline Network 390.

The host BTSs 350-1, . . . , 350-n are responsible for demodulating radio signals as well as for connecting such signals to the landline network 390 through the one or more base station controllers 360 and the mobile switching center 385. The landline network is typically a Public Switched Telephone Network (PSTN) or an Integrated Service Digital Network (ISDN), but it may also be a Public Land Mobile Network (PLMN), or a Packet Switched Data Network (PSDN). In the reverse direction, the host BTSs 350-1, . . . , 350-n also modulate signals received from the landline network through the mobile switching center 370 to format them for transmission over the air through the in-band translators 320.

Regarding the arrangement of the multichannel host BTS 350-1 ... 350-n, each particular host BTS, e.g. multichannel host BTS 350-1 serves the multiple in-band translators associated with a given cluster 240 of cells 250, e.g. in-band translators 320-1-1, ..., 320-1-12. In the embodiment disclosed in FIG. 3, each multichannel host BTS 350-1 and 350-n is depicted as serving its maximum number of twelve in-band translators 320-1-1, ..., 320-1-12, and 320-n-1, ..., 320-n-12, respectively.

The Base Station Controller (BSC) 360, of which there may be more than one, has a number of functions. The primary function is to manage the logical connections made between mobile stations 380 and the landline network. In order to do so, the Base Station Controller 360 assigns transmit and receive radio carrier frequencies to each individual mobile station 380, in-band translator 320, and host BTS 350. Typically, there may be five to twenty multichannel host BTSs 350-1, ..., 350-n serviced by a single Base Station Controller 360.

U.S. Pat. No. 5,537,435 entitled "Transceiver Apparatus Employing Wideband FFT Channelizer with Output Sample Timing Adjustment and Inverse FFT Combiner for a Multichannel Communication Network" issued Jul. 16, 1996 and which is assigned to AirNet Communications Corporation, the assignee of this application, describes the details of several embodiments of the multichannel BTS 350.

Further, the Base Station Controller 360 controls communication between the components of system 300 and the OMC 370. Specifically with regard to the repeaters 320 of the present invention, OMC 370 receives alarms and status-indidating signals from, and transmits commands to, in-band translating repeaters 320. Whereas this communication is typically conducted via dedicated telephone lines, which requires that a modem be installed in each remotely located repeater 320, the present invention accomplishes such signaling through wireless techniques.

Figure 4:
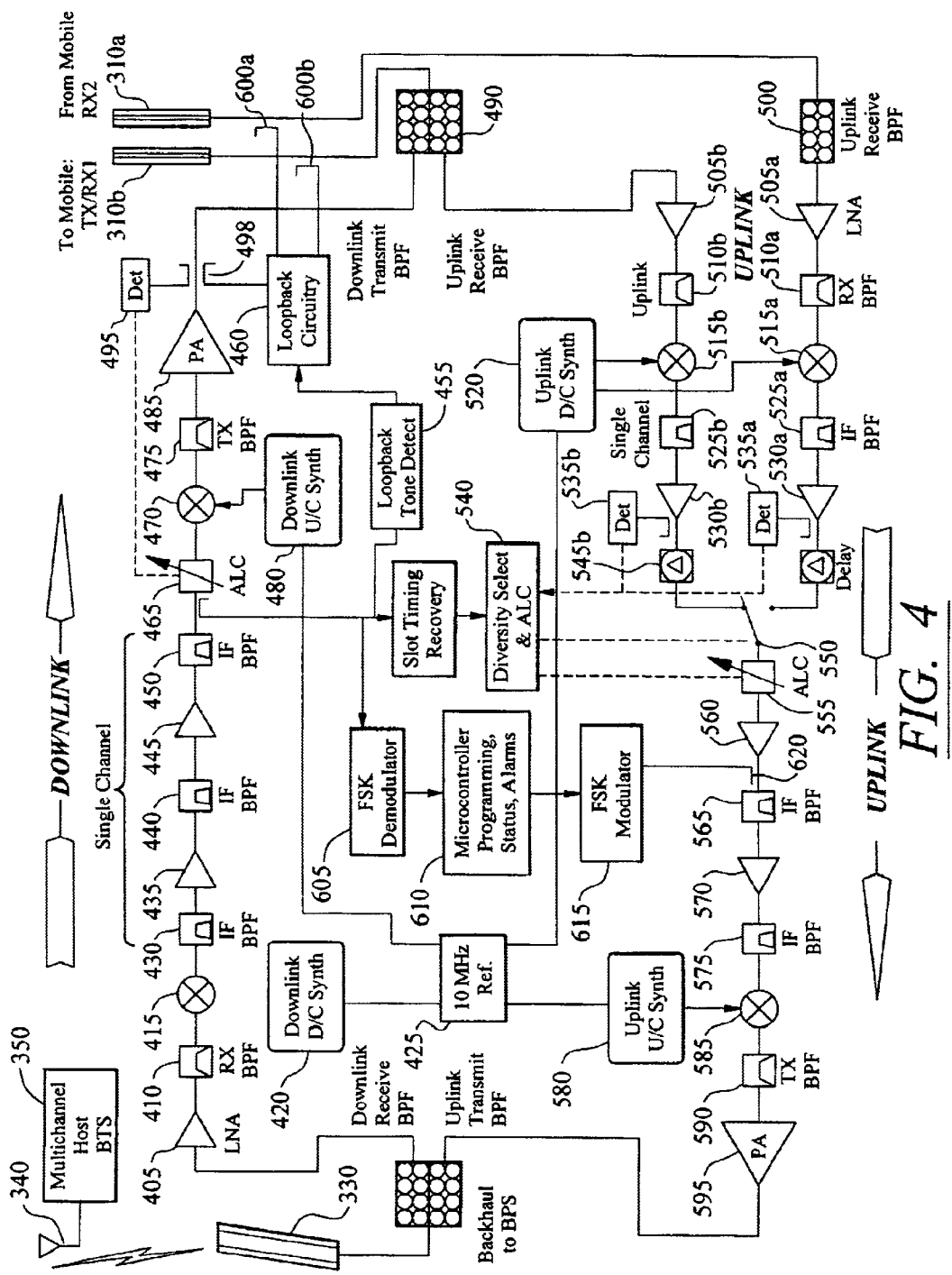
FIG. 4 is a detailed block diagram of a repeater embodying the present vention in a GSM-1900 system.

FIG. 4 is a detailed block diagram of the components of an exemplary in-band translator 320 employing the wireless in-band signaling of the present invention in a GSM-1900 wireless system. During normal operation, a modulated GMSK carrier from the multichannel host BTS 350 is continuously transmitted in the "backhaul" downlink to the remotely located in-band translating repeater 320. The repeater 320 receives this signal on the directional transmit/receive antenna 330 from the multichannel home base station 350 and forwards the signal to the duplexer 400. The RF signal output provided by theduplexer 400 is passed to a first low noise amplifier 405, receive bajndpass filter 410, and mixer 415, which is driven by downlink downconvert synthesizer 420, which is phase-locked to 10 MHz reference 425. Mixer 415 converts the downlink signals to an intermediate frequency, and intermediate bandpass filter 430 provides the first limitation of the transmit frequency of the downlink IF signal to a single channel. Intermediate frequency bandpass filters 440 and 450 additionally limit transmitted energy to the desired single channel, after receiving the signal from amplifiers 435 and 445 respectively. Loopback tone detector 455 accepts as an input a coupled signal from the output of the IF band pass filter 450 in the downlink signal path. The loopback tone detector 455 controls the loopback circuitry 460, which couples and mixes signals from the transmit path into the two receive signal paths originating in the in-band translator 320 at the omnidirectional receive antennas 310a and 310b.

The output of the intermediate frequency bandpass filter 450 is forwarded to the automatic level control attenuator 465, which feeds in sequence an RF mixer 470, and transmit bandpass filter 475 where the signal is up-converted back to the RF transmit band, being in the present embodiment 1930–1990 MHz. Downlink up-convert synthesizer 480, like all synthesizers in the in-band translator 320, is phase-locked to a common 10 MHz reference 425. The output of transmit bandpass filter 475 is in turn fed to the power amplifier 485 prior to being fed to the transmit portion of the duplexer 490, ultimately out to the transmit/receive diversity antenna 310b, where the "ground" downlink signal is transmitted to mobile station 380. ALC attenuator 465 is controlled based on the energy output of power amplifier 485 measured by detector 495.

In the uplink direction, the mobile station 380 returns a signal to the translator 320 via the pair of spatially diverse ormnidirectional antennas, 310a and 310b. In the preferred embodiment shown in FIG. 3, omnidirectional antenna 310a is receive only, while omnidirectional antenna 310b is transmit/receive. Further in the preferred embodiment of the present invention, antennas 310a and 310b are spaced at least 8 wavelengths, apart, or more than 4 feet at 1900 MHz, using the GSM-1900 standard of the current embodiment. A separate receive filter 500 and the receive portion of duplexer 490 provide a portion of the RF receive band to a pair of radio frequency (RF) signal processing chains consisting of a pair of low noise amplifiers (LNA) 505a, 505b, receiver band-pass filter 510a, 510b that limits the received energy to the desired RF band such as the GSM-1900 uplink band allocated from 1850 to 1910 MHz. The mixers 515a, 515b which are driven by a first synthesizer, uplink downconvert synthesizer 520, convert the received signals to an intermediate frequency, and IF band pass filters 525a, 525b, limit the IF signal to a single channel. The mixers 515a, 515b, IF band pass filters 525a, 525b, and intermediate frequency amplifiers 530a, 530b, comprise an IF stage.

Uplink downconvert synthesizer 520 and other synthesizers in the translator 320 share a common 10 MHz reference 425. The IF center frequency is typically chosen to be approximately 188 MHz, with a 310 KHz channel bandwidth associated with the IF bandpass filters.

Detectors 535a and 535b measure the power of the filtered channel of the radio frequency energy of the two signals provided by the amplifiers 530a, 530b, which are in turn fed to the diversity select and automatic level control (ALC) processor 540. ALC processor 540 compares the instantaneous power level of the two signals fed to it by detectors 535a and 535b. Surface acoustic wave (SAW) delay elements 545a, 545b delay the transmitted diversity signals from both amplifiers 530a and 530b, while the instantaneous power levels are compared by ALC processor 540. ALC processor 540 performs slot-by-slot selection of the diversity signal with the higher powerlevel and controls the operation of switch 550 so as to transmit the higher energy diversity signal to ALC alternator 555. The process proceeds generally as follows for a GSM-type signal: the host multichannel BTS 350 will always transmit a Channel Combination V frame structure in time slot zero of the TDMA frame. The detection of time slot zero initiates a process of counting down signaling frames of the 51 multiframe control structure on physical channel 0. ALC processor 540 measures and integrates the energy during the first several bit periods for each diversity path. This integrated value is compared to a programmable threshold. If an integration exceeds the threshold, then ALC processor 540 selects the path with the strongest signal as determined by the integration. The programmable threshold is designed so that the integration of the first several bit periods of a random access control channel (RACH) burst will not exceed the threshold, due to the shorter duration and the delayed onset of the RACH bursts relative to the Normal Bursts. This programmable threshold can be a fixed threshold, or it can be made adaptive.

If the integration fails to exceed the programmable threshold, thereby indicating a RACH burst, and ALC processor 540 detects a time slot that can support a RACH burst, then the strongest available diversity path is selected in step 310, thereby synchronizing the RACH burst with the multichannel host BTS 350. If ALd processor 540 detects a time slot other than a RACH burst time slot when the integration fails to exceed the programmable threshold, then the integration is zeroed or "dumped," and a successive integration is performed. This "integrate and dump" process is repeated until either a diversity selection is made, or a preset maximum number of "integrate and dump" intervals have been reached.

To complete the uplink processing in the translator 320, the selected dirversity signal from power switch 550 is sent through a fast automatic level control (ALC) attenuator 560.

Transmit bandpass filters 565 and 575 limit transmitted energy to the desired single channel, after receiving the signal from amplifiers 560 and 570 respectively. At this point, uplink upconvert synthesizer 580 drives the mixer 585 by phase-locking to the common 10 MHz reference 425. Uplink transmit bandpass filter 590 further limits transmitted energy to the desired RF frequency range and power amplifier 595 provides the output signal to duplexer 400. Duplexer 400 transmits the signal to directional transmit/receive antenna 330, for transmission to multichannel host BTS 350, where the signal is received by omnidirectional antenna 340.

Typically, class A/B linear amplifiers are used throughout the translator 320, in both the forward and reverse paths, and the translator 320 is typically implemented with software-programmable synthesizers so that the channel settings deployed may be easily selected during installation or when the system needs to be reconfigured.

In accordance with the principles of the present invention, when the OMC 370 directs an RF loopback test, the multichannel host BTS 350 transmits a "signaling waveform," such as a continuous wave (CW) tone, for a predetermined amount of time over the "backhaul" downlink to the remotely located translator 320. Phase/frequency discrimination circuitry in the loopback tone detector 455 is used to detect the change to a signaling waveform, e.g. CW carrier, from a modulated carrier, e.g. GSM. The presence of this signaling waveform instructs the remotely located in-band repeater-translator 320 to initiate its RF loopback mode.

Once in RF loopback mode, loopack circuitry 460 receives a coupled sample of the high power downlink transmit signal from coupler 498, attenuates and downconverts the signal to the receive band, and couples the attenuated and downconverted signal into both of the uplink low-noise input paths at couplers 600a and 600b.

While in the loopback mode, the host BTS 350 will modulate the downlink signal with "training bit" data and/or send specific random access control channel (RACH) bursts on the downlink path and detect the looped-back bursts on the returned uplink signal. This process allows for accurate timing calculations of the round-trip delay to and from the remotely located repeater translator 320, as well as a measure of signal strength and signal quality of the complete RF path. Since the remote repeater translator 320 captures all of its signal timing from the downlink signal, it is necessary to continue to send modulated "training bit" data in every slot of the TDMA frame while in loopback mode. If data is not sent in every frame, then the remote repeater translator 320 will lose synchronization with the host BTS 350.

If there is an alarm within the remote repeater translator 320, then the remote repeater translator 320 does not progress any further with the loopback function. After detecting a lack of activity, the BTS 350 will notify OMC 370 of a problem.

Further according to the principles of the present invention, when the preferred embodiment of the remote translator repeater 320 is in its loopback mode, the phase/frequency discrimination circuitry of the loopback tone detector 455 can also be used to detect phase/frequency modulated downlink data (such as FSK data), which can contain commands from the OMC 370 for action by the remote repeater 320. In the preferred embodiment of FIG. 4, the loopback tone detector 455 directs the received downlink FSK-modulated data to FSK demodulator 605, which sends the demodulated data to the repeater's microcontroller 610. Microcontroller 610 interprets the demodulated data as specific command signals and acts upon each specific signal appropriately. As examples, the FSK downlink data can be used to re-configure various tuning frequency and target gain parameters.

Also while in the loopback mode, status-indicating and alarm data can be sent back to OMC 370 via the uplink path to the host BTS 350. Microcontroller 610 sends the status-indicating signal and alarm data to FSK modulator 615. The FSK-modulated data can be coupled into the uplink path via coupler 620 as shown, or it can be directed into the uplink path via a switch (not shown). This FSK-modulated data can include internal status-indicating signals and alarm signals monitored by the microcontroller 610 of the remote repeater 320.

Figure 5:
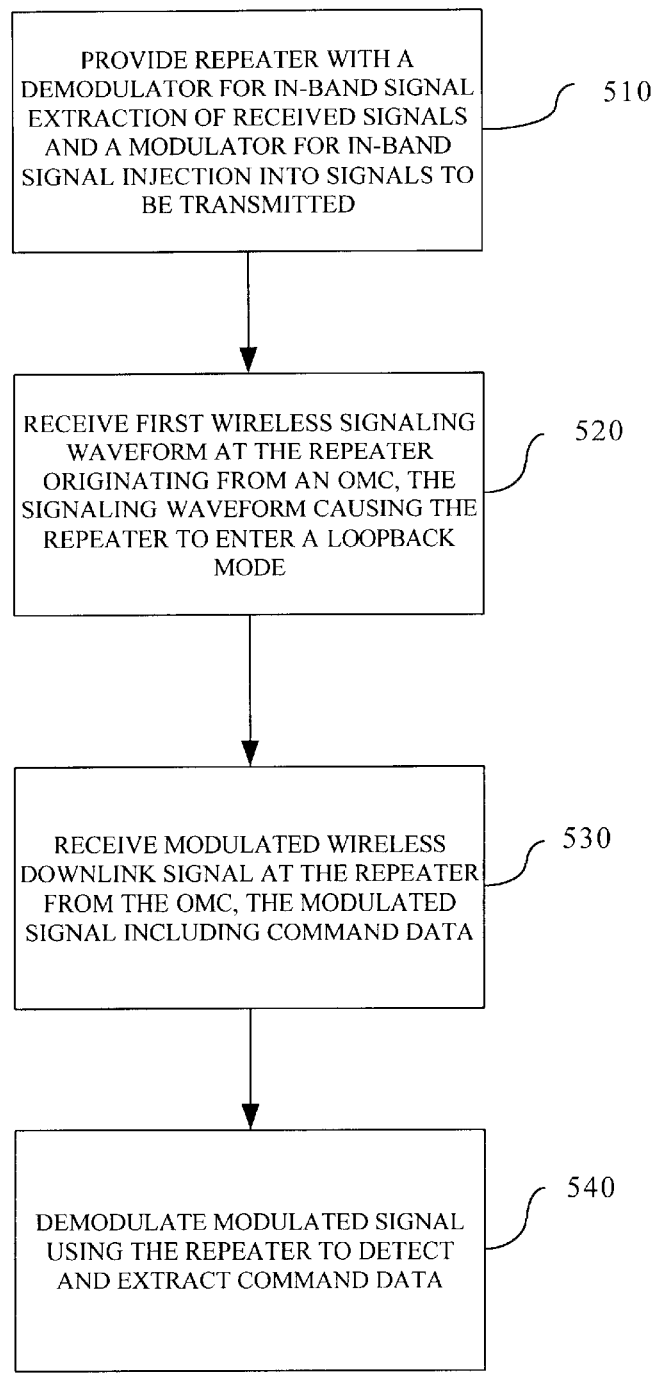
FIG. 5 is a flow chart showing steps comprising a method of providing wireless communication between an operation and maintenance center (OMC) and a wireless system repeater.

FIG. 5 shows a flow chart that includes steps comprising a method of providing wireless communication between an operation and maintenance center (OMC) and a wireless system repeater in a wireless telecommunication system comprising a plurality of cells and a broadband base transceiver station. Specifically, in-band signal extraction at a repeater is shown. In step 510, a repeater is provided including a demodulator for in-band signal extraction of received signals and a modulator for in-band signal injection into signals to be transmitted. In step 520, a first wireless signaling waveform originated from the OMC is received at the repeater, the signaling waveform causing the repeater to enter a loopback mode. In step 530, a modulated wireless downlink signal is then received at the repeater from the OMC, the modulated signal including command data. The modulated signal is then demodulated by the repeater to detect and extract the command data in step 540. The command data can include changes in power level or center frequency, which can then be implemented by the repeater.

Thus, the present invention discloses a method and apparatus for employing wireless in-band signaling for communications with a remotely located repeater, eliminating the requirement of installing a modem and a telephone line for each repeater in a wireless telecommunications system employing remote repeaters.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. In a wireless telecommunication system comprising a plurality of cells, the cells arranged into clusters wherein one of said cells within said cluster contains a broadband base transceiver station (BTS), the cellular communication system comprising:

a repeater located in each of said cluster of cells not containing said broadband base transceiver station, said repeater including a demodulator for in-band signal extraction of received signals including command data for said repeater to act upon and a modulator for in-band signal injection of at least one of status indicators and alarm data into signals to be transmitted, to an operations and maintenance center, (OMC) through said BTS.

2. A wireless telecommunication system as in claim 1, wherein said repeater is a translating repeater.

3. A wireless telecommunication system as in claim 1, wherein said repeater further comprises a microcontroller for interpreting said demodulated (data extracted by said demodulator and for providing said status indicators and said alarm data to said modulator for said in-band signal injection.

4. A wireless telecommunications system as in claim 1, wherein said wireless telecommunication system supports at least one time division multiplexed (TDM) signal protocol.

5. In a wireless telecommunication system comprising a plurality of cells the cells arranged into clusters wherein one of said cells within said cluster contains a broadband base transceiver station, BTS, a method of providing wireless communication between an operation and maintenance center, OMC, and a wireless system repeater, said method comprising the steps of:

extracting command signals at said repeater by receiving a modulated wireless downlink signal originating from said OMC, said modulated signal including in-band command data, said repeater demodulating said modulated signal to detect and extract said command date and injecting at least one of status indicators and alarm data by said repeater into signals to be transmitted to said,OMC through said BTS.

6. The method of providing wireless communication between an OMC and a wireless system repeater in accordance with claim 5, wherein:

said modulated signal comprises frequency shift key data.

7. The method of providing wireless communication between an OMC and a wireless system repeater in accordance with claim 5, wherein:

said modulated wireless downlink signal comprises a continuous wave tone.

* * * * *